Nov. 23, 1943.  J. E. GOSLINE ET AL  2,334,921
APPARATUS FOR TESTING WELLS
Original Filed Sept. 16, 1940
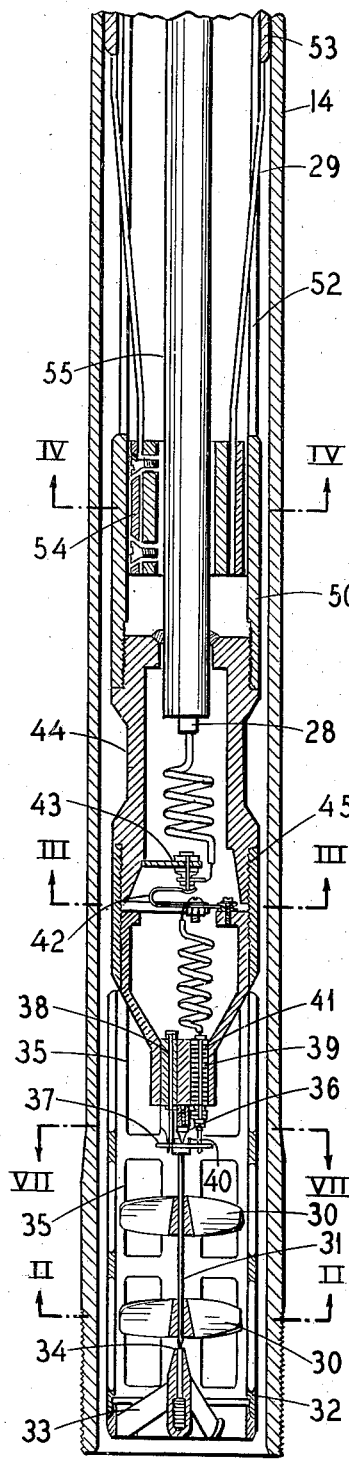
Fig. 1
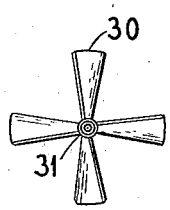
Fig. 2
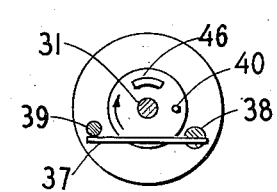
Fig. 7
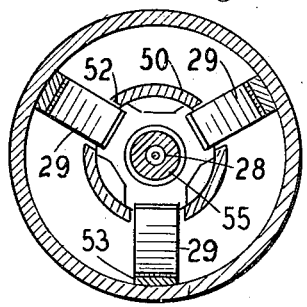
Fig. 5
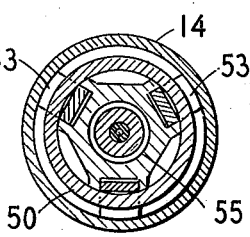
Fig. 4
Fig. 3
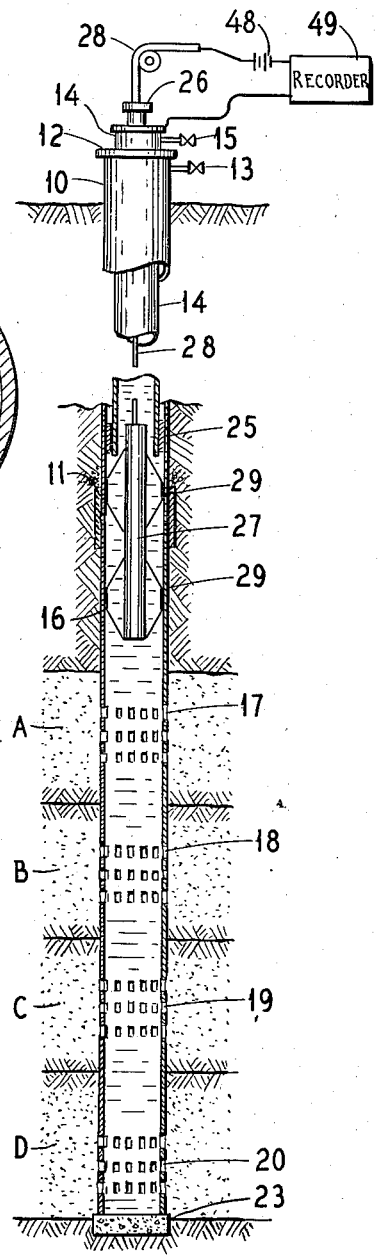
Fig. 6
INVENTORS
JAMES E. GOSLINE
WILLIAM R. POSTLEWAITE
WALTER G. MILLER
By J. G. Adams
ATTORNEY

Patented Nov. 23, 1943

2,334,921

UNITED STATES PATENT OFFICE

2,334,921

APPARATUS FOR TESTING WELLS

James E. Gosline, Berkeley, William R. Postlewaite, Palo Alto, and Walter G. Miller, Albany, Calif., assignors to Standard Oil Company of California, San Francisco, Calif., a corporation of Delaware Original application September 16, 1940, Serial No. 356,996. Divided and this application February 16, 1942, Serial No. 431,052

3 Claims. (Cl. 73—198)

This invention relates to an apparatus for testing the productivity of the various strata communicating with a well such as an oil well, and particularly refers to means for the determination of the direction and rate of flow of fluids such as oil, gas and water into or out of each of said zones during controlled flow and pressure conditions at the top of the well. This is a division of our copending application Serial No. 356,996, filed September 16, 1940 entitled "Method for testing wells."

In the production of oil and gas it is common practice to drill through a number of vertically spaced and sometimes widely separated productive strata or formations and then complete the well by setting a casing or a liner which is selectively perforated at points opposite those strata or formations which are known or believed to be productive of oil or gas.

Several methods of investigating the productivity of the different strata open to a well have been used. Certain of the electrical properties of the rocks have been helpful in this regard, such properties being determined by the commonly utilized procedures for electrical coring developed by Schlumberger. Another method of obtaining useful information relative to the vertical distribution of productivity, results from a study of the actual cores obtained from the intervals exposed to the well. Some information of a less detailed but more direct nature may be obtained by formation testing in which—provided a pressure recorder is employed in conjunction with the testing tool—data may be obtained on the pressure-production characteristics of the interval being tested as well as data relative to the nature of the fluids being produced from the interval under test. The main disadvantage of this procedure, however, is that ordinarily the number of intervals or stages which may be tested over the major interval being studied is not sufficient to provide the degree of detail required in many problems.

The value of a knowledge of the vertical distribution of productivity in connection with individual well problems as well as reservoir problems is generally recognized by engineers and operators. A typical application of this type of information is in connection with the determination of locations for perforations in the casing or liner which is placed opposite the total interval exposed and which may be cemented. Another application of this type of information is that of the nature of selective zonal production program to follow, provided it is desired to produce the various zones individually.

The methods which have been previously mentioned as yielding information useful in determining the variation in vertical productivity can be employed only before a well casing or pipe is placed in the well opposite the productive intervals. In actual practice there has been no easy and rapid method of determining the relative production of oil, gas and water from the individual strata which communicate through perforations or otherwise with the interior of the well casing or liner.

Oftentimes in the case of such a multiple zone well in which the complete interval is opened to the well bore without packers, the lower pressure zone or zones may not contribute fluids at the pressures prevailing opposite this particular zone or zones at the given rate of total production from the multiple zone well.

In such an event the distribution of velocity obtained by means of a current meter opposite these zones would indicate either that these low pressure zones were contributing no fluids to the main stream or else possibly that these zones were taking fluid from the main stream. A determination of the general characteristics of all zones open to the multiple zone well will require in this respect that fluid velocity traverses opposite all zones be made at several rates of total production from the multiple zone well. It has been found that such velocities, if they are to be interpreted properly, must ordinarily be accompanied by a simultaneous measurement of the distribution of pressure within the bore hole of the multiple zone well. For this reason it is usually essential that the current meter or fluid velocity meter be run simultaneously with a depth pressure recorder for the purpose of obtaining these measurements. Another reason for running the depth pressure recorder along with the velocity meter is that the velocity meter simply measures velocity, whereas in many instances it is desirable to obtain a knowledge of the density of the fluid flowing at the particular point of velocity measured. For example, in many instances free gas enters the well bore from one of the contributing zones along with the oil. Such entrance could be interpreted as an inflow of oil so far as the velocity measurements alone are concerned. A pressure traverse opposite the point of gas entry will, however, disclose the fact that the material entering the well bore at this point has a lower density than the material immediately below the point of entry.

An additional corroborative type of measurement which may be incorporated to advantage with the pressure measurement, to verify the type of fluid entering the well bore, is that of a temperature determination. The inflow of appreciable volumes of gas to the main stream will have a tendency to cool the fluid opposite the point or points of entry and such cooling effect may be measured and recorded by any one of the several types of accurate thermometers now available. In some instances, therefore, it may be desirable to incorporate the recording thermometer in conjunction with the velocity meter or the velocity meter and pressure recorder combination. Since ordinarily it is not feasible or desirable to measure absolute velocities at different points in the bore hole, it may only be necessary in interpreting the readings obtained from the velocity meter at different depths to refer these readings to some datum condition. The condition which may best be chosen as a datum is that at the top of the interval being studied, since at this point the total flow from the underlying zones is passing the cross section, hence the procedure in making such determination may best consist in first determining the reading at this point and referring all other readings obtained at points below this to the reading at this point.

In certain instances a multiple zone well having a zone or zones of considerably higher pressure than other zones opened to the same well will, when partially or completely shut in, exhibit the characteristic of repressuring the lower pressure zones by flow of fluids from the higher pressure zones. Depending upon whether the zone or zones being repressured are above or below the zone or zones furnishing the fluids, the direction of flow as indicated by the current meter will be either upward or downward. Hence, it is desirable in making measurements on wells of this type to have available a current meter or velocity measuring device which is capable of indicating the direction of flow of fluids within the well bore. This invention comprehends broadly the measurement of the upward or downward flow of fluid in the well bore at successive points between those formations which are considered to be releasing fluid into the bore or receiving it therefrom. At the same time it may be desirable to determine the density and temperature of the fluid so that a complete understanding of the nature of its flow may be known. Density determinations may be made by the well known means as hereinbefore set forth, such as the pressure recorder of United States Patents No. 1,955,855 and No. 2,115,018 or samplers such as that covered by Patent No. 2,147,983. The temperature determinations may be made by other well known means such as those of Patent No. 2,076,211. Desirably, but not necessarily, the flow of fluids should be measured at the center of the conduit or passage so that radial eddys, turbulence or other flow disturbing factors which may influence this determination may be minimized.

It is an object of this invention to provide an apparatus for obtaining a continuous measurement of the rate at which fluid, such as oil, gas or water or a mixture of them, may enter or leave the well bore of a well from a given production zone or zones having communication with a well bore through an open face of an earth interval or through perforations in a casing or liner and under controlled conditions of pressure and total outflow of fluids from the top of the well.

Another object is to provide an apparatus for traversing a well and casing thereof to give an indication of the relative quantities of fluids, such as oil, gas and water or a mixture of them, which may be entering or leaving the well at any given interval which is opened to the productive earth formations.

Another object is to provide an apparatus for measuring the rate and direction of fluid flow, of the fluids which pass upward through the well bore throughout a given interval in its length.

Another object is to provide an apparatus for determining the fluid flow in a well bore substantially in the center of the fluid stream so that the effect of the high radial velocities into the casing or liner through the perforations may be minimized.

Another object of this invention is to provide an improved type of fluid flow meter which is adapted to measure velocities and directions of flow in a bore, such as a well bore, and to transmit the indication of said velocities and flow directions to a remote point such as at the surface of the well.

These and other objects and advantages will be found apparent from the following description and from the attached drawings which form a part of this specification and illustrate a preferred embodiment of this invention as applied to the measurement of fluid flow at various points in a producing well.

In the drawing, Figure 1 is a vertical sectional view of a preferred form of flow meter in place in a well tubing.

Figure 2 is a horizontal sectional view on line II—II of Figure 1 showing a preferred form of impeller for the flow meter of Figure 1.

Figure 3 is a horizontal sectional view on line III—III of Figure 1 showing an arrangement for connecting the electrical contactor of the flow meter to an electric cable extending to the top of the well.

Figure 4 is a horizontal sectional view on line IV—IV of Figure 1 showing a preferred arrangement of centering guides or springs contracted to pass through a small diameter tubing.

Figure 5 is a horizontal sectional view of the centering device shown in Figure 4 in place in a well casing of larger diameter than the tubing, with the centering guides in expanded position.

Figure 6 is a vertical sectional diagrammatic view of a well showing a preferred arrangement of casing and tubing for determining the total flow of fluid.

Figure 7 is an enlarged horizontal sectional view on line VII—VII of Figure 1 showing a preferred form of contactor that may be used to indicate direction as well as rate of flow of the well fluids.

In the drawing, reference number 10 designates generally a well casing which extends downwardly from the surface of the earth to a point 11 where it may be cemented or otherwise sealed above the producing formation. At the upper end of casing 10 is a conventional casing head 12 provided with the usual outlet 13 for gas and means for supporting a central tubing 14 having one or more valved outlets 15. Below point 11 a liner or casing 16 extends downwardly through the upper strata and through the productive formations designated A, B, C, D. Opposite those formations which are believed to be productive liner 16 is selectively perforated as at 17, 18, 19, 20. The lower end of liner 16 is usually sealed as by a cement plug 23. Packer 25 may be used to seal the annular space between tubing 14 and the casing or liner 16.

In order to carry out the procedure of this invention the means for testing fluid flow, density and temperature are necessarily of such an outer diameter as to pass freely through the bore of tubing 14 so that they may be lowered from the top of the well and placed at different levels therein without interfering with the actual production from the well. To that end, casing head 12 is provided with a stuffing box 26 through which the test devices generally designated 27 may be lowered by means of a supporting cable 28, the latter also serving to transmit desired indications or electrical impulses to the surface, where they may be observed or recorded as temperature, pressure, density, fluid flow or any of these values. Figure 6 shows these several devices mounted within a single casing 27 or at least connected together to be adjacent to each other and in position below the lower part of tubing 14 and above any of the zones of perforations. Desirably, but not necessarily, the flow responsive means is placed at the bottom or top of assembly 27 so that it will be capable of measuring the flow of fluid at substantially the center of the flow stream. In order to facilitate this condition the test device 27 is preferably fitted with outwardly extending spring guides 29 having enough flexibility to center the test devices in the tubing 14 and also in the larger diameter liner 16 as are shown in Figures 4, 5 and 6.

Referring to Figures 1 to 5 inclusive, one preferred embodiment of a flow indicating means consists generally of a pair of impellers 30 mounted upon a central spindle 31, the latter being rotatably supported axially within a frame 32. The lower end of this frame is provided with a spider 33 carrying central bearing 34, preferably jeweled or at least arranged to impose very little friction against the rotation of spindle 31. Intermediate its length, frame 32 is ported or slotted as at 35 and likewise is open at its lower end so that fluids passing upwardly or downwardly through the casing, tubing or liner in which it may be positioned will have free access to impellers 30 and the latter will be responsive to substantially the central portion of the flowing fluid stream. The upper end of spindle 31 is likewise journaled at 36 so as to be freely rotatable under the low fluid velocities usually encountered.

Adjacent the upper end of spindle 31 is a contacting mechanism, one form of which is shown in Figures 1 and 7 and which is adapted to close or open an electrical circuit in a predetermined manner for each revolution of the impellers and spindle. In this example, the contactor comprises a thin flexible strip or wire 37 of corrosion resistant conducting material, preferably tungsten, silver plated bronze or the like, which is supported by a first terminal 38 and extends transversely past a second terminal 39. Strip 37 is normally in contact with second terminal 39 and is urged away from the latter by a small eccentric pin 40 and a spaced cam 46 secured to spindle 31. Terminal 38 is grounded to the frame 32 of the device, the other terminal being insulated by a suitable bushing 41 and connected to the spring 42 of a separable contactor 43 mounted at the upper end of frame 32.

In the example shown, if the direction of fluid flow causes spindle 31 to rotate in the direction of the arrow, Figure 7, pin 40 will interrupt briefly the contact between strip 37 and terminal 39 and shortly thereafter cam 46 will interrupt that contact for a longer period. Thus there will be a short break followed quickly by a longer break in any electric current transmitted through cable 28. If the fluid flow acting upon the impellers 30 is in the opposite direction, for example downwardly instead of upwardly, the cam 46 will be first to act, followed by pin 40, so that there will be a long break followed quickly by a short one. In this manner, not only the speed of rotation of the spindle 31 and impellers 30 and hence the rate of fluid flow in the well, may be determined but also the direction of the rotation and the flow that causes it. Obviously, there are numerous modifications of such a contactor that could be made, the one illustrated being merely a preferred form, in which 40 and 46 are spaced about 90 degrees apart to operate as set forth above.

Desirably, frame 32 is removably connected to a metal support member 44 by means of screw threads 45 so that it may be detached for cleaning, calibration and inspection of its relatively delicate parts and bearings. Contactor 43 is adapted to complete an electrical circuit with a suitably insulated electric cable 28 which extends upwardly to the surface of the earth. Cable 28 is illustrated as being of the single conductor type, the other part of the circuit being completed to the surface of the earth through member 44 and springs 29 which extend outwardly to contact metal casing 10. At the upper end of the cable on the surface of the ground are any suitable source of electrical current 48 and a means 49 for indicating or recording the electrical conditions set up by the contacting means described above.

Referring specifically to Figures 1, 4 and 5, it will be noted that above support 44 there extends a tubular body 50, slotted longitudinally at 52 to permit the spacing spring guides 29 to extend outwardly and contact the inner surface of the tubing or casing in which the apparatus may be positioned. Desirably, springs 29 are provided with shoes 53 so that they will not be caught or worn through by contact with the wall of the casing or tubing during passage upwardly and downwardly through the tubing and casing. At the lower ends of springs 29 a bearing block 54 may be provided to slide longitudinally within body 50 and cause springs 29 to expand or contact equally. A hollow steel tube 55 is desirably positioned centrally within body 50 to protect cable 28 from injury and also serves to give an inner bearing for block 54.

The operation of this apparatus will be obvious from the foregoing discussion and description. With the control apparatus 13 and 15 associated with casing head 12 adjusted to provide the desired fluid flow and pressure conditions for the well, a flow indicating means, such as the one just described, preferably together with means for determining the density and the temperature of the fluid at a given point in the well adjacent the flow indicating means, are lowered to a point above the uppermost perforation zone 17. After a sufficient period of time has elapsed for flow conditions to become steady, a determination of flow rate, temperature and density of fluid is made. This is the total flow from the well. By lowering these devices to successive points in the well casing, for example immediately above perforations 18, 19 or 20, which are open to the corresponding producing zones B, C and D, other readings of flow direction, flow rate, density and temperature may be obtained. By suitably comparing these data, that proportion of flow which comes from or is lost to any single zone through its respective perforations may be determined. Obviously, the sequence of such operations and the means and method for determining temperature, density and flow are dependent upon the individual well conditions and are not to be limited by the apparatus here shown or the procedure just outlined. However, it has been determined that this apparatus will give indications of the productivity or receptivity of separate zones in a much more rapid and economical manner than those heretofore used.

Although a specific embodiment of this apparatus has been described and illustrated, it is obvious that many changes could be made without departing from the invention, and all those that come within the scope of the appended claims are embraced thereby.

We claim:

1. A flow meter for well testing comprising an open, ported frame adapted to be positioned axially in a well bore, a rotatable impeller in said frame responsive to fluid flow along said bore and through said frame to turn in one direction or the other depending upon the direction of said flow with respect to said frame, said frame adapted to position said impeller in said well bore without materially obstructing fluid flow through the latter, and means associated with said frame responsive to the direction and rate of rotation of said impeller for transmitting out of said well bore an indication of the direction and rate of flow of said fluid in said bore with respect to said frame.

2. A flow meter according to claim 1 in which said impeller comprises an axial flow radially vaned rotor positioned in said frame to rotate in either direction, and said direction and rate of rotation responsive means comprise an electrical contactor, so constructed and arranged that it will transmit a recurrent signal when said impeller rotates in one direction and a distinguishably different recurrent signal when said impeller rotates in the opposite direction.

3. A flow meter according to claim 1 in which said direction and rate of rotation responsive means for said impeller comprise an electric contactor and a plurality of spaced cam means rotated by said impeller to actuate said contactor according to a predetermined sequence, said sequence due to rotation of said impeller in one direction being distinguishable from the sequence due to rotation of said impeller in the opposite direction.

JAMES E. GOSLINE.
WILLIAM R. POSTLEWAITE.
WALTER G. MILLER.